(12) United States Patent
Sanguinetti (10) Patent No.: US 8,533,069 B2
(45) Date of Patent: Sep. 10, 2013

(54) SYSTEM, METHOD, AND COMPUTER PROGRAM PRODUCT FOR REALIZATION OF ONLINE VIRTUAL OBJECTS

(76) Inventor: Thomas V. Sanguinetti, San Diego, CA (US)

( * ) Notice: Subject to any disclaimer, the term of this patent is extended or adjusted under 35 U.S.C. 154(b) by 1124 days.

(21) Appl. No.: 11/923,538

(22) Filed: Oct. 24, 2007

(65) Prior Publication Data

US 2009/0112359 A1 Apr. 30, 2009

(51) Int. Cl.
*G06Q 30/00* (2012.01)

(52) U.S. Cl.
USPC .......................... 705/27.1; 705/26.1; 705/319

(58) Field of Classification Search
USPC .............. 705/26, 27, 26.1, 27.1, 319
See application file for complete search history.

(56) References Cited

U.S. PATENT DOCUMENTS

| | | | | |
|---|---|---|---|---|
| 7,478,054 | B1 * | 1/2009 | Adams et al. | 705/26 |
| 2002/0095298 | A1 | 7/2002 | Ewing | |
| 2002/0116276 | A1 | 8/2002 | Ottley | |
| 2007/0124212 | A1 * | 5/2007 | Storch et al. | 705/26 |

OTHER PUBLICATIONS

PCT/US/2008/080754 search report, Jan. 2, 2009, Tommy V. Sanguinetti.

* cited by examiner

*Primary Examiner* — Courtney Stopp
(74) *Attorney, Agent, or Firm* — Kyle M. Pendergrass (57) ABSTRACT

A system, method, and computer program product for an online transferring system where a conveying user may transfer a virtual object, representative of a real object, to a receiving user using an electronic ID of the receiving user and have a real object delivered to a shipping address of the receiving user without knowledge of the shipping address by the conveying user. The system includes an electronic data store having a set of identifying information for a receiving user. The set of identifying information includes an electronic ID and a physical contact address. The system includes a communication system for communication between the conveying user and the receiving user. The communication system provides the electronic ID to the conveying user without providing the physical contact address to the conveying user. The system includes a virtual object, representative of a real-world object, associated with the conveying user. The system includes a physical shipping system, coupled to the communication system, for initiating a delivery of the real-world object to the physical contact address responsive to the conveying user communicating the virtual object to the electronic ID.

22 Claims, 5 Drawing Sheets

SYSTEM, METHOD, AND COMPUTER PROGRAM PRODUCT FOR REALIZATION OF ONLINE VIRTUAL OBJECTS

FIELD OF THE INVENTION

The invention relates generally to online systems, methods, and computer program products. More specifically, the invention relates to a system, method and computer program product for anonymous association among users in an online social network and for a conveying user to send a virtual object to an electronic ID, virtual identity or the like of a receiving user and for sending a realized object (e.g., real-world tangible product or service) to the physical contact address of the receiving user without a priori physical contact address of the receiving user by the conveying user.

BACKGROUND OF THE INVENTION

Existing online social network sites allow users to interact with other users who are online acquaintances that they rarely or never interact with in person. Users may wish to send each other a realized object (e.g., real-world tangible product or service), which requires knowledge of a physical address. A user may feel awkward asking an online acquaintance for their physical address when wishing to send a realized object. When wishing to send a surprise or anonymous realized object to an online acquaintance, a user may need to ask the online acquaintance for their physical address, thus eliminating the element of surprise or anonymity the sending user may have desired. Users are often unable to send each other a realized object because they do not have access to each other's physical addresses and are often not comfortable sharing their physical addresses with online acquaintances.

Users can share messages, pictures, and games with each other but all of these items are virtual objects being shared and presented to each other via an online arena. However, a user cannot send something more substantial such as a realized (e.g., real-world tangible product or service) object to a user without knowing their physical address.

There are some websites that involve proxy handlers, which allow certain items to be sent anonymously to certain recipients without having to disclose the recipients' physical address. However, these websites usually require users who are receiving the items to register online and set up a wish list of items they are seeking. Other users may select, purchase, and send a particular item that the user who registered their wish list may be looking forward to receiving.

Amazon.com allows users to set up certain items as part of a wish list. Users can buy an item from the wish list for the user who created the wish list. One drawback to this system is that the receiving user decides which items to place in their wish list, which can be limiting and detracts from the element of surprise.

Other proxy systems permit a user to establish a registry (similar to a wish list) and permit one user to send items to another. In these cases, the items are pre-selected and the recipient's physical address is typically known. Examples include Babiesrus.com and Hallmark.com.

Babiesrus.com implements a "Baby Registry" system where users who have newborn babies set up accounts with a list of items they would like to receive from other users (usually friends and family). Users are permitted to search the baby registries by registry number or last name and can select items from a predetermined list to send to the new parents without having to enter their physical address or other identifying information because the new parents entered this information upon registration. One drawback is that the recipient has knowledge of the fact that they will be receiving certain items. Also, in some cases, the process of looking up registries can be tedious.

U.S. Pat. No. 6,931,419 entitled "Data management system for automatically accessing, maintaining, propagating user data among plurality of communities, each of which contains plurality of members" (the '419 patent) describes a community membership data management system that identifies each user and their associated communities of interest. Each community has a user defined permission to access a subset of the user's data, which data is shared among some or all of the members of that community. When the user's data is updated, the update is automatically propagated to all of the identified associated communities of interest and the members of those communities who have permission to receive that data. Thus, each user of the present community membership data management system has their computerized calendar and address book system automatically populated with data, which data is continuously and automatically updated. The confidentiality and security of the user data is maintained by defining a set of permissions among the communities, members of communities and for each user to ensure that the user maintains control of the propagation of their data. Each user therefore maintains a "virtual user image" in each of the communities, where the members of that community view only one aspect of the user's personal data. The system disclosed in the '419 patent does not allow a user to send a tangible product or service to another user without prior knowledge of the recipient's physical address.

BRIEF SUMMARY OF THE INVENTION

A system, method, and computer program product is directed to an online conveying system where a conveying user may transfer a virtual object, representative of a real object, to a receiving user using an electronic ID or other virtual ID of the receiving user and have the real object delivered to a physical contact address or the shipping address of the receiving user without knowledge of the physical contact address or the shipping address by the conveying user.

The system includes an electronic data store having a set of identifying information for the receiving user. The set of identifying information includes an ID and a physical contact address. The system also includes a communication system, coupled to the electronic data store, for connecting a conveying user to the electronic data store. The communication system provides the ID of the receiving user to the conveying user without providing the physical contact address of the receiving user to the conveying user. The system also includes a fulfillment system, coupled to the communication system, for initiating a real-world delivery of the real-world object to the physical contact address responsive to conveyance of the virtual object to the fulfillment system.

The method includes conveying a virtual object, representative of a real-world object, to the receiving user. The method also includes identifying the physical contact address or shipping address of the receiving user, wherein the physical contact address or the shipping address remains undisclosed to the conveying user. The method also includes notifying a fulfillment system of the conveyance of the virtual object to the receiving user. The method also includes delivering the real-world object to the physical contact address or the shipping address in response to the notification to the fulfillment system.

Advantages of the present invention include delivery of "surprise" real objects to a user associated with an electronic ID without the conveying user knowing the physical contact or shipping address of the receiving user and without the receiving user developing a priori a list of desired real objects or learning of an impending delivery of a known object, such as by deletion of an object from their list. It is also an advantage that a conveyed virtual object, associated with the virtual identity of a receiving user, represents possession of a delivered (or impending delivery) real-world object and therefore has an intrinsic and implied value among users of an online community.

DETAILED DESCRIPTION OF THE INVENTION

In one example embodiment of the invention, an online conveying system allows a conveying user to transfer a virtual object, representative of a real object or a service or an experience, to a receiving user using an electronic ID, some other type of virtual ID, or any other representation of, or reference to, the receiving user and have the real object delivered to a physical contact address or shipping address of the receiving user without knowledge of the physical contact address or the shipping address by the conveying user. In another example embodiment, the real object may not be representative of the virtual object. Various modifications to the example embodiments and the generic principles and features described herein will be readily apparent to those skilled in the art. Thus, the invention is not intended to be limited to the embodiment shown but is to be accorded the widest scope consistent with the principles and features described herein.

In the following discussion, the term "conveying" is used in a special sense. For example, conveying a virtual object from a conveying user to a receiving user results in a transfer that associates the virtual object with the receiving user. This conveyance is not required to imply in every case a change in an association of the virtual object with respect to the conveying user. That is, in some instances, the conveying user may maintain an association with the virtual object and in other instances, the virtual object may be disassociated from the conveying user under some circumstances. In other instances, the nature of the association may be changed in some way but not disassociated (completely or partially). Also, the term "virtual object" may be representative of real world tangible goods, services or experiences. For example, a virtual object may be representative of tangible objects such as flowers, chocolates, CDs, candles, or a dress. Also, a virtual object may be representative of a service such as a car wash or a house cleaning service. A virtual object may also be representative of an experience such as a trip or an experience at a resort, a spa or a nightclub. Likewise, the terms "real object" or "real-world object" may be a tangible goods (e.g., flowers, chocolates, furniture, vehicles, etc.) or a service (e.g., car wash, house cleaning service, etc.) or an experience (e.g., trip to a resort, a spa or a nightclub). Also, the terms "shipping address", "delivery address", physical address", "physical contact address", "physical shipping address" and the like are used interchangeably.

The following description and claims also use the term "ID" or "electronic ID" or "virtual ID" and related words in their expansive sense to include any electronic data that may serve as an absolute unique mapping to a particular "user" or a "collection of users" or a relative unique mapping that is unique within the subject reference pool. For example, account numbers, telephone numbers, email addresses, photos, avatars, icons, any other representations of, or reference to, a user or a collection of users may all be an ID or an electronic ID or a virtual ID for understanding the embodiments of the present invention.

By user, the following description not only includes a person operating the system, but includes processes and daemons and other automated/autonomous entities that may or may not be controlled (directly or indirectly) by a person.

It is common for many reasons for a user to isolate their online life from their physical life and it is important to preserve the ability of users to maintain this isolation while providing the user with some of the advantages of the online world in their real world life and vice versa. For example, it is relatively easy to exchange virtual objects such as games, videos, photos, electronic greeting cards, or icons of various real-world objects between users and many users have little concern for providing virtual delivery addresses for these virtual objects. However it is often desirable to limit knowledge of the physical delivery address thereby impairing delivery of real world objects. In one example embodiment of the invention, a system and method facilitates protected delivery of a real world object to the physical delivery address of the user in response to communication of a virtual object to the user or to a proxy or agent of the user. For example, the proxy or agent may include a fulfillment center that includes an electronic data store that links an ID of a receiving user to a physical delivery address. The electronic data store may be a database or any other data storage system. When a virtual object is conveyed to the fulfillment center and associated with an ID (e.g., an electronic ID, a virtual ID, or the like), a real world object associated with the virtual object is provided to the user at the physical delivery address. Advantageously, a conveying user does not need to know the physical delivery address of the receiving user and does not require that the receiving user preselect the real world object, among other advantages. In another example embodiment of the invention, a conveying user conveys a virtual object to a receiving user, and the fulfillment center delivers to the receiving user a real-world object that is unrelated to the virtual object. In other words, a conveying user may deliver to the receiving user a real world object that is not associated with the virtual object. For example, the virtual object conveyed to the receiving user may be an icon of a box of chocolates while the real world object delivered to the receiving user may be a gift certificate to a resort or a spa or the real world object delivered to the receiving user may be flowers or a bottle of wine. The fulfillment center may be implemented in partnership with a third party such as, for example, a centralized shipping center, a third-party contractor (e.g., ProFlowers, See's), a major online retailer (e.g., Amazon.com or Overstock.com) or other major retailers (e.g., WalMart). The fulfillment center may be established and operated by a system that implements one or more embodiments of the invention. It will be apparent to those skilled in the art that the fulfillment center may be implemented in a variety of ways.

In one example embodiment of the invention, an online social network includes a collection of users (e.g., tens, hundreds, thousands, or millions of users) each having some unique electronic identification (e.g., user name, email address, handle, avatar, picture, photo, icon or any reference to the user, or the like) by which users refer to one another. Additionally, some of the users may have detailed real-world information (e.g., phone numbers, addresses, and other personally identifiable information) that users are generally not interested in passing out to the public at large.

Figure 1:
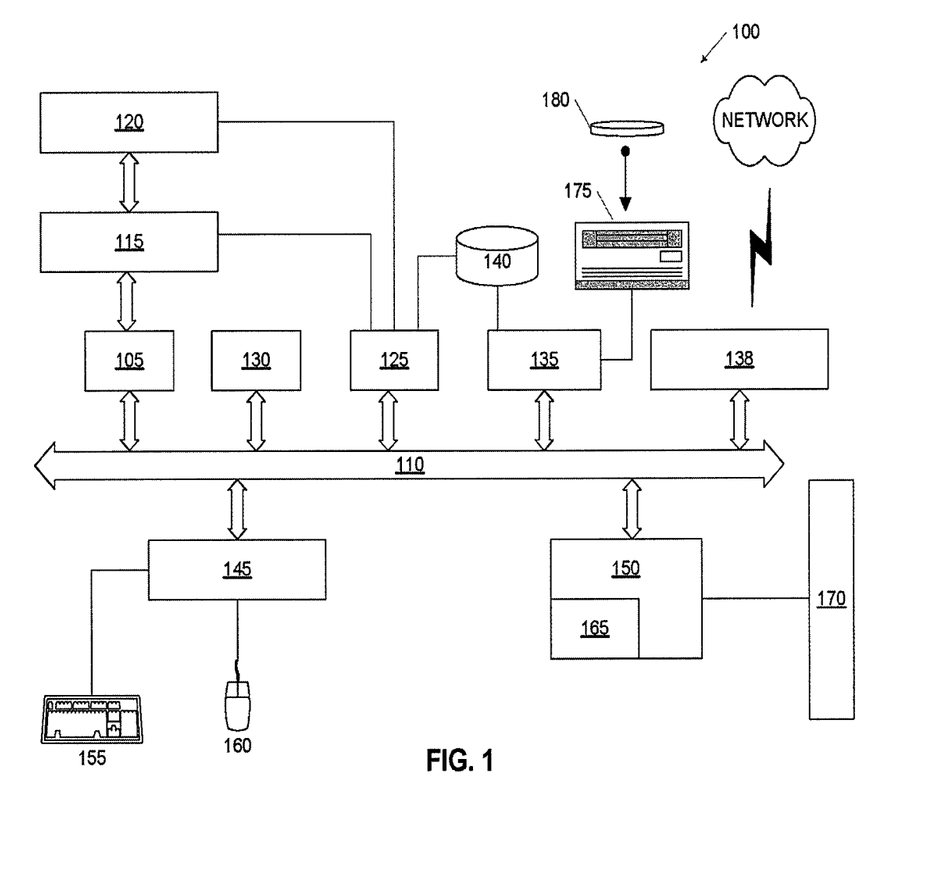
FIG. 1 is a computer system used in the implementation of an example embodiment of the invention.

FIG. 1 is a computer system 100 that may be used to implement an example embodiment of the invention including at least portions of the disclosed embodiments. The computer system 100 includes a central processing unit (CPU) 105, such as one of the PDA (personal digital assistant) microprocessors, PC microprocessors or workstations, e.g. Intel™ processor used in a personal computer, workstation, portable electronic device or other microprocessor or microcontroller or controller, and is interconnected to various other components by a system bus 110. An operating system 115 runs on CPU 105, provides control and is used to coordinate the function of the various components of FIG. 1. The operating system 115 may be one of the commercially available operating systems such as the Palm OS available from PalmSource, Inc.; Microsoft's Windows, Apple's Tiger, as well as UNIX and AIX operating systems, and the like. One or more application programs 120, controlled by the system, are moved into and out of a main memory RAM 125. These programs include a program of the present invention to be subsequently described in combination with local or wide-area network systems, such as for example, the Internet. A read only memory (ROM) 130 is connected to the CPU 105 via the bus 110 and includes the Basic Input/Output System (BIOS) that controls the basic computer functions. The RAM 125, an I/O adapter 135 and a communications adapter 138 are also interconnected to system bus 110. The I/O adapter 135 may be a Small Computer System Interface (SCSI) adapter that communicates with a disk storage device 140 or other communications protocol including serial advanced technology attachment controller and its protocol(s). A communications adapter 135 interconnects the bus 110 with an outside network enabling the data processing system to communicate with other such systems over a Local Area Network (LAN) or Wide Area Network (WAN), which includes, of course, the Internet, the WEB, intranets, extranets, and other public and private networks. The terms associated with the network are meant to be generally interchangeable and are so used in the present description of the distribution network. I/O devices are also connected to the system bus 110 via a user interface adapter 145 and a display adapter 150. A keyboard 155 and a pointing device (e.g., mouse 160 or a joystick, remote keypad, game controller, stylus, button navigations system, or the like) are all interconnected to a bus 110 through the user interface adapter 145. The display adapter 150 includes a frame buffer 165, which is a storage device that holds a representation of each pixel on a monitor or display screen 170. Images may be stored in a frame buffer 165 for display on monitor 170 through various components, such as a digital to analog converter (not shown) and the like. By using the aforementioned I/O devices, a user is capable of inputting information to the system through the keyboard 155 (or other input device) or a mouse 160 (or other pointing system) and receiving output information from the system via display 170. The system also contains a memory cache and includes a portion of disk storage drive 140 and a portion of RAM 125. Adapter 135 may also be used for other storage types 175 (e.g., the illustrated optical drive) for reading and in some cases writing computer readable instructions to/from a tangible substrate (e.g., an optical disc 180), such as computer instructions that enable the system 100 to implement all or a portion of the present invention or embodiments described herein. It will be apparent to those skilled in the art that other computing systems having different architecture may also be used to implement the embodiments of the invention.

As noted above, the embodiments of the present invention may use a wide range of computing systems and devices. One example embodiment may use one or more wireless-network-connected electronic devices (e.g., portable or mobile computing system) in communication with a server application and optionally one or more desktop/workstation personal computers. Client applications are supported by the electronic device and communicate via a wireless network connection, as described in more detail herein. Additionally to simplify the following discussion, it is noted that the example embodiments of the invention contemplates use on many different communications networks, both public and private. In some implementations, multiple different types of network systems may be used together, and the server may, for example, bridge different communications networks and translate/convert between different protocols/formats to exchange messages between the devices and to exchange communications with any device. In the following example, use of the Internet accessed through wireless access points is described as an example embodiment though other configurations are within the scope of the invention.

Additionally, one embodiment among many different alternative embodiments includes implementation of a "Make It Real"™ feature associated with a social networking site. MakeItReal, or MIR, is a general reference to features and functions of the various disclosed embodiments that provide a real-world tangible object responsive to a virtual object. Various components of the methods and systems described are identified with a MIR prefix, such as MIR-Space, MIR client, MIR server, MIR devices, and the like as more specifically described herein.

A social networking site, is for example, an online virtual meeting/collaboration resource in which various users have virtual identities that interact with other virtual identities of other users. These virtual identities often are referenced using an ID. In the social networking site, a user may have an option of conveying a virtual representation of an object (an icon of a box of chocolates or flowers for example) to another virtual identity through the ID. A fulfillment system or process associated with the networking site (integrated or stand-alone for example) makes the virtual box of chocolates or flowers real by delivering a real box of chocolates or flowers to the real user associated with the virtual identity represented by the ID. The fulfillment system or process may be used to deliver a real-world object that is unrelated to the virtual object. For example, a virtual representation of a box of chocolates or flowers may be conveyed to a receiving user and the fulfillment system may be used to deliver to the receiving user a bottle of champagne or wine, a CD, or any other tangible object, a service (e.g., a carwash, house-cleaning) or an experience (e.g., a gift certificate to a spa or a resort). There are many different ways that the fulfillment system or process may be implemented and integrated/associated with the social networking site and many different ways in which initiation of conveyance of a virtual object to a receiving user (directly or indirectly) having a known ID and a confidential physical delivery address may initiate a real-world delivery.

Before going further into details of specific embodiments, set forth below is a general perspective of the various elements and methods that may be related to the invention. Since a major aspect of the invention is directed to network communications, preferably Internet communications using Internet and/or Web protocols, and use of data messaging similar to access of Web pages, an understanding of such networks and their operating principles may be helpful. The following does not go into great detail in describing the networks to which the present invention is applicable. For details on Web nodes, objects and links, reference is made to the text, Mastering the Internet, G. H. Cady et al., published by Sybex Inc., Alameda, Calif., 1996; or the text, Internet: The Complete Reference, Millennium Edition, Margaret Young et al., Osborne/McGraw-Hill, Berkeley, Calif., 1999. Any data communication system that interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Figure 2:
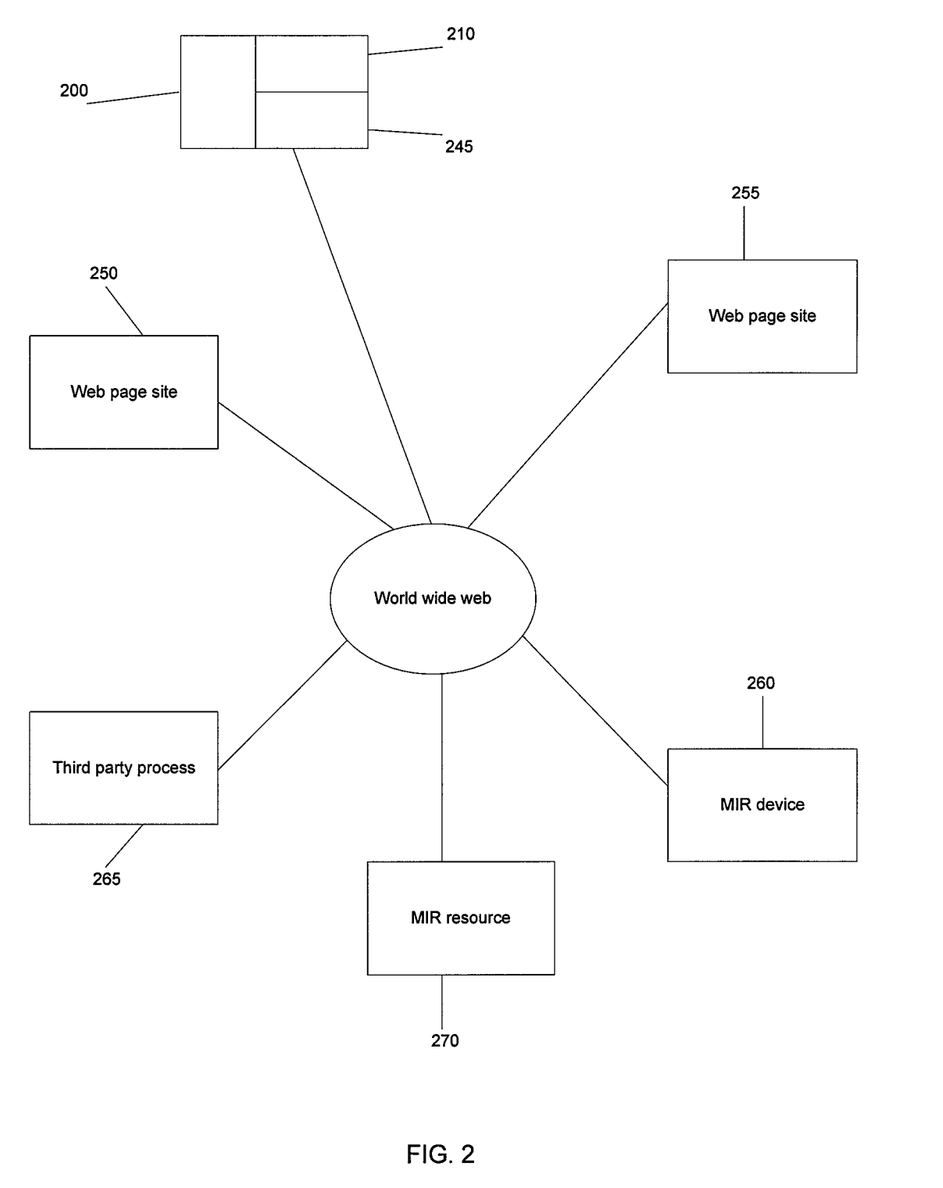
FIG. 2 is an example embodiment of a portion of a network system connected to a client terminal.

FIG. 2 is an example embodiment of a portion of a network system (e.g., the Web or the Internet) to which a client terminal 200 used for transmitting or receiving messages is connected. The client terminal 200 may be implemented by the computer system 100 shown in FIG. 1. For purposes of the embodiment, the client terminal 200 serves as a client station and has received and displayed a local MIRSpace 210. The MIRSpace 210 may, for example, be a website, a device based application on a computer or a mobile device, or an online-based application. Reference may be made to the above-mentioned Mastering the Internet, pp. 136-147, for typical connections between local stations to the Web via network servers, any of which may be used to implement the system on which this invention is used. The client terminal 200 may be connected to the World Wide Web 225 or the Internet using any type of wired or wireless network connections. A local data structure representative of a local MIRSpace 210 has been developed at the terminal 200. A MIR client program 245 operates within terminal 200 to transceive and process (e.g., display) the local MIRSpace 210 on terminal 200. Also communicated to the World Wide Web 225 are a web site 250 and a web site 255, where remote resources are stored and accessible to computing systems. In addition, the system includes one or more additional MIR clients (e.g., MIR device 260), third-party processes 265 (e.g., printing, archiving, and the like), and additional MIR resources 270. Depending upon implementation, the third-party process 265 and/or the MIR resources 270 may include one or more data stores (e.g., a database) or fulfillment services. It will be apparent to those skilled in the art that the system of FIG. 2 is illustrated merely as an example embodiment and the system of FIG. 2 can be implemented in other ways also.

In one example embodiment of the present invention, support for natural and instant ad hoc collaboration networks are setup simply and exist only as long as desired. A first participant uses a MIR client to create a MIRSpace (with any access controls) from desired content and provides the access information to other participants. As these other participants attach to the MIRSpace, the content is reproduced in each local MIRSpace of each attaching MIR client. Each user participates in the session and as the other participants detach, the content from the MIRSpace of the detaching participant is removed from the device supporting the local MIRSpace, leaving no presence behind. The first participant may use content from a removable memory system operable with the electronic device supporting the MIR client to also leave no copy of the desired on the electronic device. In some instances, the MIR client is operable from the removable memory system as well. Thus these ad hoc collaboration networks have low resource requirements, are created easily, and may be configured to leave no trace of the clients or of the content on supporting electronic devices as the network is dismantled—a non-persistent network with non-persistent content that enhances data security and ensures that each ad hoc network includes the latest and most current content available to the originator/creator.

Figure 3:
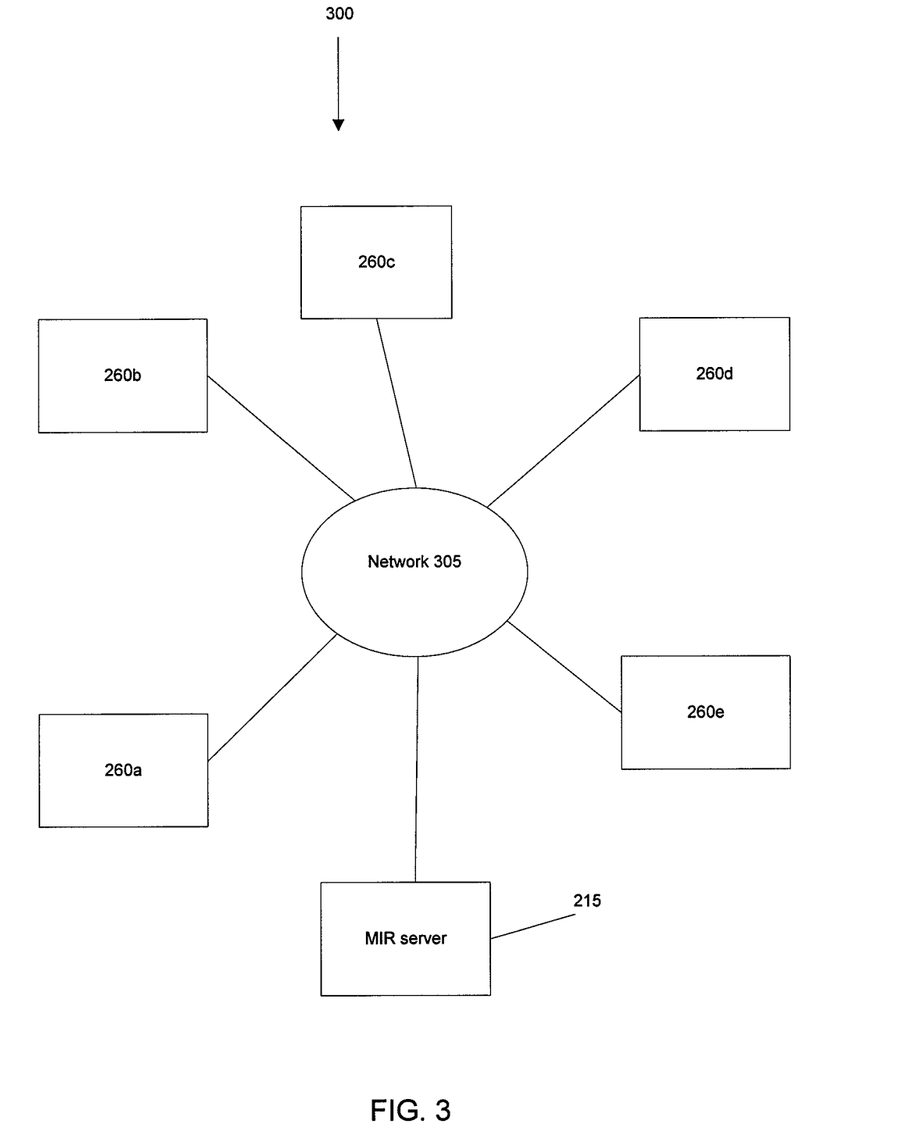
FIG. 3 is a generalized schematic of a MIR system.

FIG. 3 is a generalized schematic of a MIR system 300. The system 300 includes a plurality of MIR devices 260$x$, each supporting a MIR client 245 as shown in FIG. 2, each exchanging messages with a server such as a MIR server 215 and with other MIR devices 260 through the MIR server 215 through a network 305. Each MIR device 260$x$ is linked to the MIR server 215 and initially is able to exchange messages with only the MIR server 215. The MIR server 215 includes one or more data structures for supporting message exchange among a set of MIR devices 260. Any MIR device 260 successfully attaching to one of these data structures thereafter exchanges messages with all other MIR devices attached to the same data structure. The MIR server 215 routes messages from one MIR device 260 attached to a data structure to one or more other MIR devices 260 also attached to the same data structure. Thus, the server 215 may be supporting multiple sets of MIR devices 260, each participating in an independent message exchange with server 215 routing all messages as appropriate. In one example embodiment, the system supports multiple message exchange from multiple clients to other attached clients.

Figure 4:
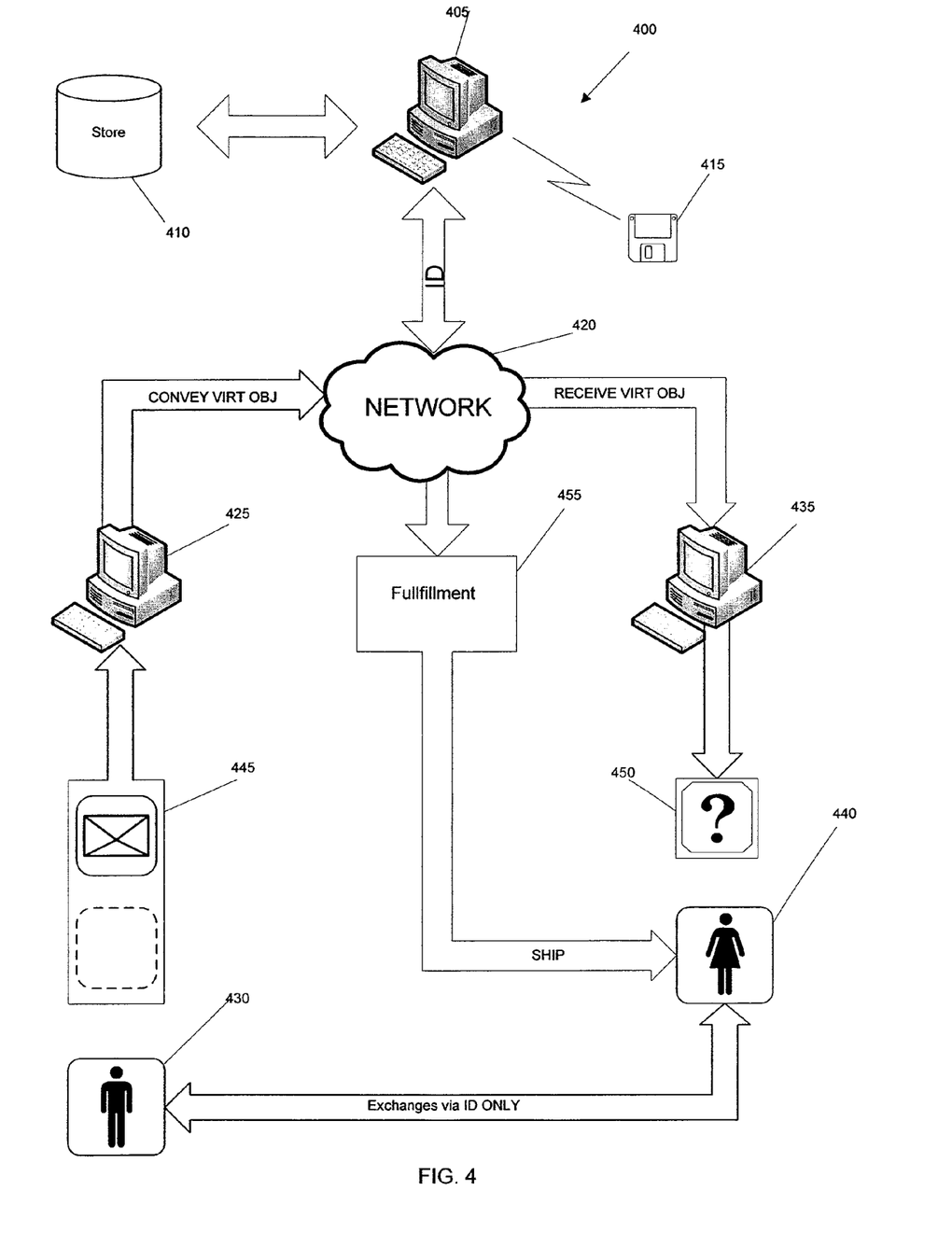
FIG. 4 is a block diagram of one example embodiment of a MIR system.

FIG. 4 is a block diagram of one example embodiment of a MIR system 400. System 400 includes a MIR server 405 that is a specially-programmed server coupled to an electronic data store 410. The data store 410 may be a database or any other data storage system. The data store 410 includes a set of identifying information for a receiving user. The set of identifying information for the receiving user may include an ID and a physical contact address. In certain embodiments, there will be many receiving users, each having a set of identifying information as noted above. Cooperating with the server 405 is a media system 415 (e.g., computer readable disk, optical disk, hard drive and the like) for storing computer program instructions that interact with one or more computing systems (e.g., server 405) to cause the system to operate substantially as described herein.

The server 405 is linked to a network 420 that supports any conveying functions, receiving functions, and fulfillment functions according to any particular implementation. Note that these functions are shown discrete but may physically be integrated with other functions shown in FIG. 4. A MIR client device 425 implements any conveying functions through communication with the network 420. A conveying user 430 (whether a real person or an automated/autonomous process) operates MIR client device 425.

A receiving user device 435 implements any receiving functions required by the implementation. The device 435 is linked to the network 420. A receiving user 440 operates device 435.

The MIR client 425 supports a conveying process 445 and is responsive to the conveying user 430 to initiate conveyance of a virtual object (represented by an envelope icon in FIG. 4 which is a placeholder for any suitable representation for the virtual object). The receiving user device 435 supports an optional receiving process 450 to indicate to the user 440 the conveyance of the virtual object from user 430.

It is not necessary to provide advance notification to the user 440 or to provide an identification of the precise virtual object, such as when the user 430 wishes to provide some surprise/mystery element. The process 450 may either indicate exactly the identity of the conveyed virtual object and/or "real" object, it may indicate conveyance of some virtual object and/or "real" object, or provide the user 440 with no indication. Thus all or a portion of the identity of the virtual object and/or the "real" object may be masked from receiving user.

A fulfillment process 455, responsive to the conveyance of the virtual object, makes the virtual object real for the user 440 by delivery of a tangible object to the user 440 at a physical delivery address. The user 430 need know only some ID of the user 440 recognized by the system 400 and the fulfillment process 455 is able to obtain the physical delivery address associated with that ID. Exchanges between user 430 and user 440 need be conducted by ID only. In one example embodiment of the invention, the tangible object, also referred to as the real-world object, may be unrelated to the virtual object. For example, the virtual object conveyed to the receiving user may be an image of a box of chocolates or flowers or some other icon, and the real object delivered to the receiving user may be a bottle of wine, a book, or a gift certificate to a resort or a spa or a ticket to a concert.

While the system 400 is an example embodiment other embodiments are possible and within the scope of the present invention. The system 400 has been described using the term conveyance instead of delivery and conveyance has a special meaning when applied to the embodiments of the present invention. In some instances, conveyance includes delivery, such as a copy of the virtual object being delivered from the process 445 to the process 450. This includes the case where the virtual object is copied from the process 445 to the process 450 as well as the case where the virtual object is moved from the process 445 to the process 450.

Further, the system 400 is described in the context of having various functions, such as for example the fulfillment process 455, being responsive to conveyance of the virtual object. Depending upon configuration and options enabled by the system 400, the fulfillment process 455 may be triggered by any user associated with the virtual object. In some cases, simply conveying the virtual object from the process 445 to the process 450 with the desired option will trigger the fulfillment process 455 to make the virtual object real for the user 440. The system 400 or one of the embodiments of the invention allows a conveying user to deliver a real world object responsive to the conveyance of a virtual object and without the conveying user having the physical contact address of the receiving user. In some embodiments, the conveying and receiving user are the same.

Figure 5:
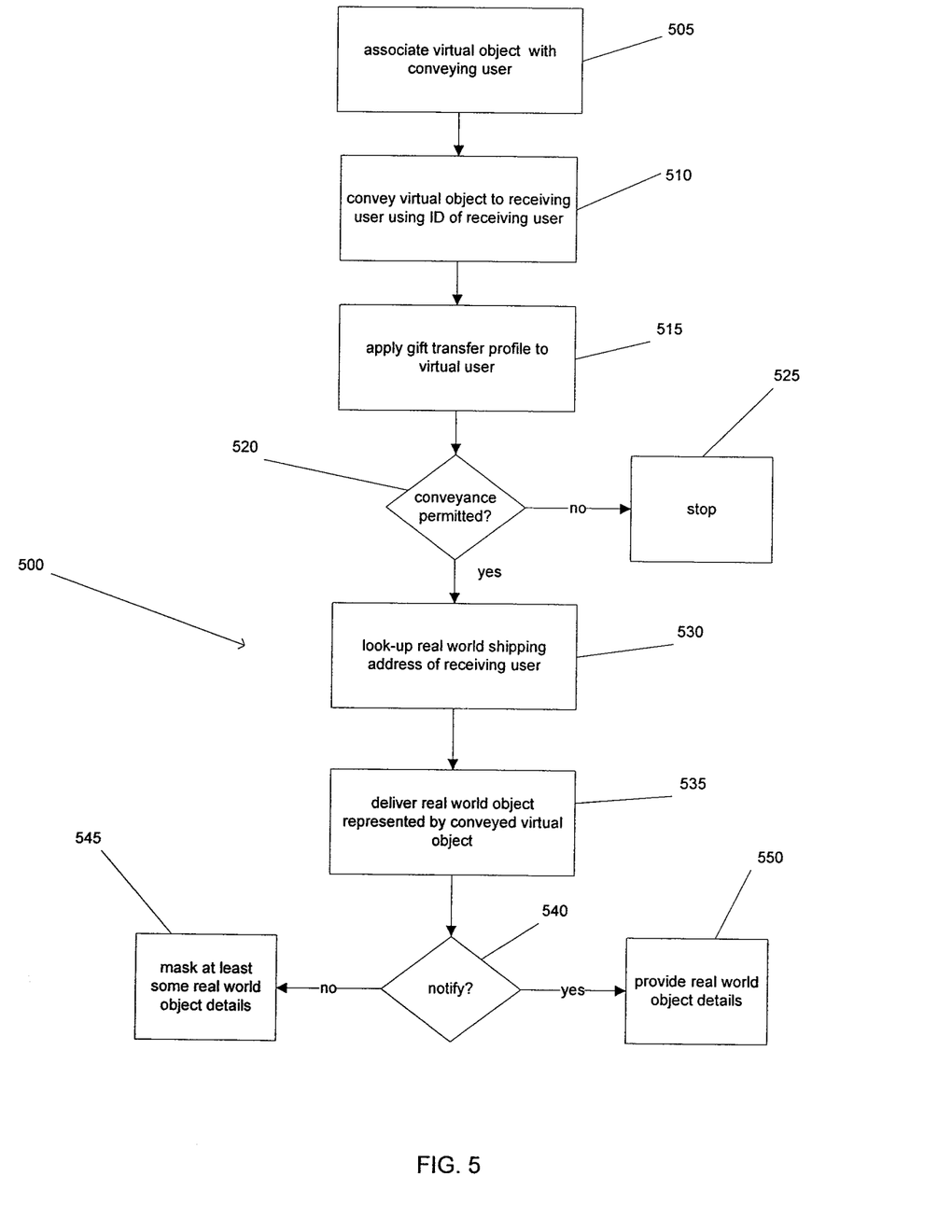
FIG. 5 is a flow diagram of a MIR process according to one example embodiment of the invention.

FIG. 5 is a flow diagram of a MIR process 500 according to one example embodiment of the invention. The process 500 begins at a block 505 that associates a virtual object with a conveying user. This association may be direct (for example a user "purchasing" a virtual object for the account of the user) or indirect wherein a user identifies themselves to a third-party having possession of virtual objects. The process 500 may allow the user to select one or more virtual objects that are available for purchase or allow the user to select one or more virtual objects that are freely available without any requirement for a purchase or a payment. The association may be simply a minimal set of information such as to debit an account of the conveying user for conveyance of the virtual object/realizing the virtual object for the intended receiving user.

Next at a block 510, a gift transfer profile of the receiving user is applied to the conveyance (a gift: e.g., an unsolicited conveyance of a virtual object). The gift transfer profile provides settings and options, when implemented, to permit a user to control an ability of other users to convey virtual objects, real world objects and realizations of virtual objects.

As discussed before, the real world objects may be unrelated to the virtual objects, or the virtual objects may be representative of the real world objects. A user may determine whether virtual objects may be conveyed, who may or may not convey virtual objects, the types of virtual objects that are or are not conveyable, among other options. The specific options depend upon the implementation.

Next at a block 515, a test is applied to determine whether the particular conveyance is allowed (or not disallowed in some cases). If the test at the block 515 is negative, the process 500 branches to block 520 from the block 515 and halts the conveyance. The halt may include information to the conveying user regarding why the conveyance did not proceed.

If the test at the block 515 is positive and the conveyance is permitted, at a block 525, the virtual object is conveyed to the receiving user using an ID of the receiving user. There are variations to the block 525 relating to when the virtual object is conveyed, whether direct or indirect, and how much information is conveyed.

The process 500 then advances to a block 530 to determine the physical shipping address (physical contact address) of the receiving user (since in one embodiment the conveying user does not have access to the physical shipping address). In one example embodiment, an ID of the receiving user is a key into the electronic data store to access the physical shipping address of the receiving user.

After the block 530, the process 500 advances to a block 535 in which a real-world object (e.g., a realization of the virtual object) is delivered or shipped to (or the delivery initiated to) the physical shipping address of the receiving user. In one example embodiment, a fulfillment function associated with the system is involved in the block 535. In one example embodiment, the gift transfer profile of the receiving user is applied to the real world object to determine if the conveyance of the real world object is allowed or disallowed. As will be appreciated, this test is especially useful if the real world object is unrelated to the virtual object. For example, the gift transfer profile may allow the conveyance of a virtual object that is an icon or a picture of a box of chocolates or flowers. However, if the real world object that is attempted to be conveyed is a gift certificate to a resort or tickets for a vacation, the gift transfer profile may block the conveyance of the particular real world object. As discussed before, the real world object may be unrelated to the virtual object and thus this test is useful.

In one embodiment, after the block 535, the process 500 advances to a test block 540 to determine whether the receiving user is to receive a notice with all information regarding the real-world conveyance. When the test at the block 540 is negative, some or all of the real-world object details are masked from the receiving user at block 545 who may receive no notification or a notice that "Something Special" is scheduled for delivery on a specific delivery date. However, when the test at the block 540 is positive and the receiving user is to receive a notice with all details of the real-world object conveyance, the process 500 advances to a block 550, which provides the user with all details of the real-world object and its delivery.

It is an advantage that a receiving user is not required to pre-build a list of objects that may be made real or that a conveying user is not limited to pre-defined choices made by system 500.

While the process shown in FIG. 5 depicts a check against a conveyance profile prior to a conveyance of a virtual object, these blocks, and others, may be reordered in some embodiments. For example, some embodiments have the flexibility, when desired to first check a gift transfer profile of many users, and then only convey or associate a virtual object with those users (or a subset of those users selected on other criteria) who accept certain types of items or certain types of gifts. It may also be desirable to first convey the virtual object to the receiving user before, or without, initiating a check against a gift transfer profile. In some embodiments it is desirable to provide an indirect conveyance/association, where the result may be an association with a community or group of users (i.e. an indirect association), after which all users in that group may receive an object. In one example embodiment, the realization of a virtual object causes the virtual object to be changed ("changed virtual object") to indicate that fulfillment has occurred. The changed virtual object indicating the realization of the virtual object may be associated with the ID or profile of a receiving user. For example, a conveying user may convey a virtual object representative of a real-world object to a receiving user and then convey the real-world object to the receiving user via the fulfillment system. The virtual object conveyed to the receiving user will change to indicate that the real-world object corresponding to, or related to, the virtual object has been conveyed to the receiving user. The virtual object may change in color, shape, or other form, start to glow, flash, look glossy, have an animation, have a notice, or have other special effects to indicate the realization of the virtual object.

The system above has been described in one embodiment including a server (e.g., MIR server) and a plurality of MIR clients and MIR users. In alternate embodiments, the MIR clients communicate via a peer-to-peer communications system in addition to or in lieu of Server/Client communications.

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a general purpose digital computer, software applications, routines and software modules, hardware including application specific integrated circuits, programmable logic devices, field programmable gate arrays, optical and other mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A system for allowing a conveying user to send online virtual objects to display on a social network of a receiving user and for allowing the conveying user to send a real-world object to the receiving user without the conveying user having the physical contact address of the receiving user, comprising:

an electronic data store having a set of identifying information for the receiving user, the set of identifying information including an ID and a physical contact address;

a communication system, coupled to the electronic data store, for connecting a conveying user to the electronic data store, the communication system providing the ID of the receiving user to the conveying user without providing the physical address of the receiving user to the conveying user, the communication system communicating an icon that is representative of a real-world object, to the conveying user and conveying the icon to the receiving user which is displayed on the online social network of the receiving user; and a fulfillment system, coupled to the communication system, for initiating a real-world delivery of the real-world object to the physical address responsive to conveyance of the icon to the receiving user, and wherein the communication system subsequently changes the conveyed icon displayed on the online social network to indicate that the real-world object has been delivered to the receiving user.

2. The system of claim 1, wherein the appearance of the conveyed icon changes in shape or color.

3. The system of claim 1, wherein the system provides, via the online social network, the unchanged icon to a third party before the real-world object has been delivered to the receiving user, and further provides the changed icon to the third party after the real-world object has been delivered to the receiving user.

4. The system of claim 1, wherein the electronic data store further comprises a conveyance permissions profile associated with the receiving user, the conveyance permissions profile qualifying conveyances of any object and icon from the conveying user to the receiving user.

5. The system of claim 1, wherein the icon represents ownership or possession of the real-world object.

6. A social networking system for allowing a conveying user to send a virtual object to a receiving user for display on the social networking system and for allowing the conveying user to send a real world object to the receiving user without the conveying user having the physical contact address of the receiving user, comprising:

an electronic data store having a set of identifying information for the receiving user, the set of identifying information including an ID and a physical contact address;

a communication system, coupled to the electronic data store, for connecting a conveying user to the electronic data store, the communication system providing the ID of the receiving user to the conveying user without providing the physical contact address of the receiving user to the conveying user, the communication system communicating the virtual object, representative of a real-world object, to the conveying user and conveying the virtual object to the receiving user which is displayed on the online social network of the receiving user; and a fulfillment system, coupled to the communication system, for initiating a real-world delivery of the real-world object to the physical contact address responsive to conveyance of the virtual object to the receiving user, and wherein the communication system changes the form of the virtual object displayed on the social networking system of the receiving user to indicate that the real-world object has been delivered to the receiving user.

7. The system of claim 6, wherein the virtual object is an icon for display on the social networking system, and the displayed icon changes to indicate that the real-world object has been delivered to the receiving user.

8. The system of claim 6, wherein the virtual object is an icon for display on the social networking system, and wherein the displayed icon is associated with the receiving user after the real-world object has been delivered.

9. The system of claim 6, wherein the electronic data store further comprises a conveyance permissions profile connected to the communication system, the conveyance permissions profile being associated with the receiving user, the conveyance permissions profile qualifying conveyances of any object from the conveying user to the receiving user.

10. The system of claim 6, wherein the system provides, via the online social network, the unchanged virtual object to a third party before the real-world object has been delivered to the receiving user, and further provides the changed virtual object to the third party after the real-world object has been delivered to the receiving user.

11. A method for realization of online virtual objects by allowing a conveying user to send a real-world object to display on a social network of a receiving user without the conveying user having physical contact address of the receiving user, the conveying user and the receiving user being connected by a communication network, the method comprising:

conveying, by the communication network, a virtual object, representative of a real-world object, to display on a social network of a receiving user, wherein the virtual object is an icon;

identifying the physical contact address of the receiving user, wherein physical contact address remains undisclosed to the conveying user;

notifying, by the communication network, a fulfillment system of the conveyance of the virtual object to the receiving user;

initiating delivery of the real-world object to the physical contact address in response to the notification to the fulfillment system;

changing, by the communication network, the conveyed virtual object displayed on the receiving user's social network to indicate that the delivery of the real-world object has been initiated; and conveying, by the communication network, the changed virtual object to a third user of the social network that includes the conveying user and the receiving user.

12. The method of claim 11 further comprising identifying the physical contact address of the receiving user by utilizing an ID of the receiving user, the ID being associated with the physical contact address in a database.

13. The method of claim 11 further comprising maintaining a conveyance permissions profile for qualifying conveyances of any objects from the conveying user to the receiving user, wherein the conveyance permissions profile limits conveyances of the objects to the receiving user.

14. The method of claim 11 further comprising sending the receiving user at least a portion of data associated with the real-world object prior to completion of the delivery of the real-world object.

15. The method of claim 11 further comprising sending the receiving user the identification of the conveying user.

16. A method for conveyance of online virtual objects and real-world objects to a receiving user without the conveying user having the physical contact address of the receiving user, the conveying user and the receiving user being connected by a communication network, the method comprising:

conveying, by the communication network, a virtual object, representative of a real-world object, to display on a social network of a receiving user based on a determination that the conveyance of the virtual object to the receiving user is permitted;

identifying the physical contact address of the receiving user by utilizing a user ID of the receiving user, the user ID being linked to the physical contact address;

notifying, by the communication network, a fulfillment system to initiate delivery of the real world object to the receiving user, wherein the real world object is delivered to a physical contact address of the receiving user and wherein the physical contact address of the receiving user is not disclosed to the conveying user, and wherein the virtual object displayed on the social network of the receiving user changes in color or shape to indicate that the real-world object has been delivered to the receiving user.

17. The method of claim 16 further comprising maintaining a conveyance permissions profile for qualifying conveyances of virtual objects from the conveying user to the receiving user, wherein the conveyance permissions profile limits conveyances of virtual objects to the receiving user.

18. The method of claim 16 further comprising maintaining a conveyance permissions profile for qualifying conveyances of real world objects from the conveying user to the receiving user, wherein the conveyance permissions profile limits conveyances of real world objects to the receiving user.

19. The method of claim 16 further comprising sending, by the communication network, to the receiving user at least a portion of data associated with the real world object prior to completion of the delivery of the real world object.

20. A computer program product comprising a non-transitory computer usable medium having computer-readable instructions embodied on the computer-readable medium executing a method for initiating a delivery of a real-world object by a fulfillment system, the method comprising:

conveying an icon, representative of the real-world object, to display on a social network of a receiving user;

identifying the physical contact address of the receiving user, wherein physical contact address remains undisclosed to the conveying user;

notifying the fulfillment system of the conveyance of the icon to the receiving user;

initiating delivery of the real-world object to the physical contact address in response to the notification to the fulfillment system; and changing the icon displayed on the social network of the receiving user to indicate that the delivery of the real-world object has been initiated.

21. The computer program product of claim 20, wherein the method further comprises identifying the physical contact address of the receiving user from a user ID of the receiving user, the user ID being associated with the physical contact address in a database.

22. The computer program product of claim 21, wherein the appearance of the icon changes in shape or color.

* * * * *